Feb. 1, 1955
C. G. HARBORDT ET AL
2,701,067
RETORT CHARGING MACHINE
Filed May 22, 1952
7 Sheets-Sheet 2
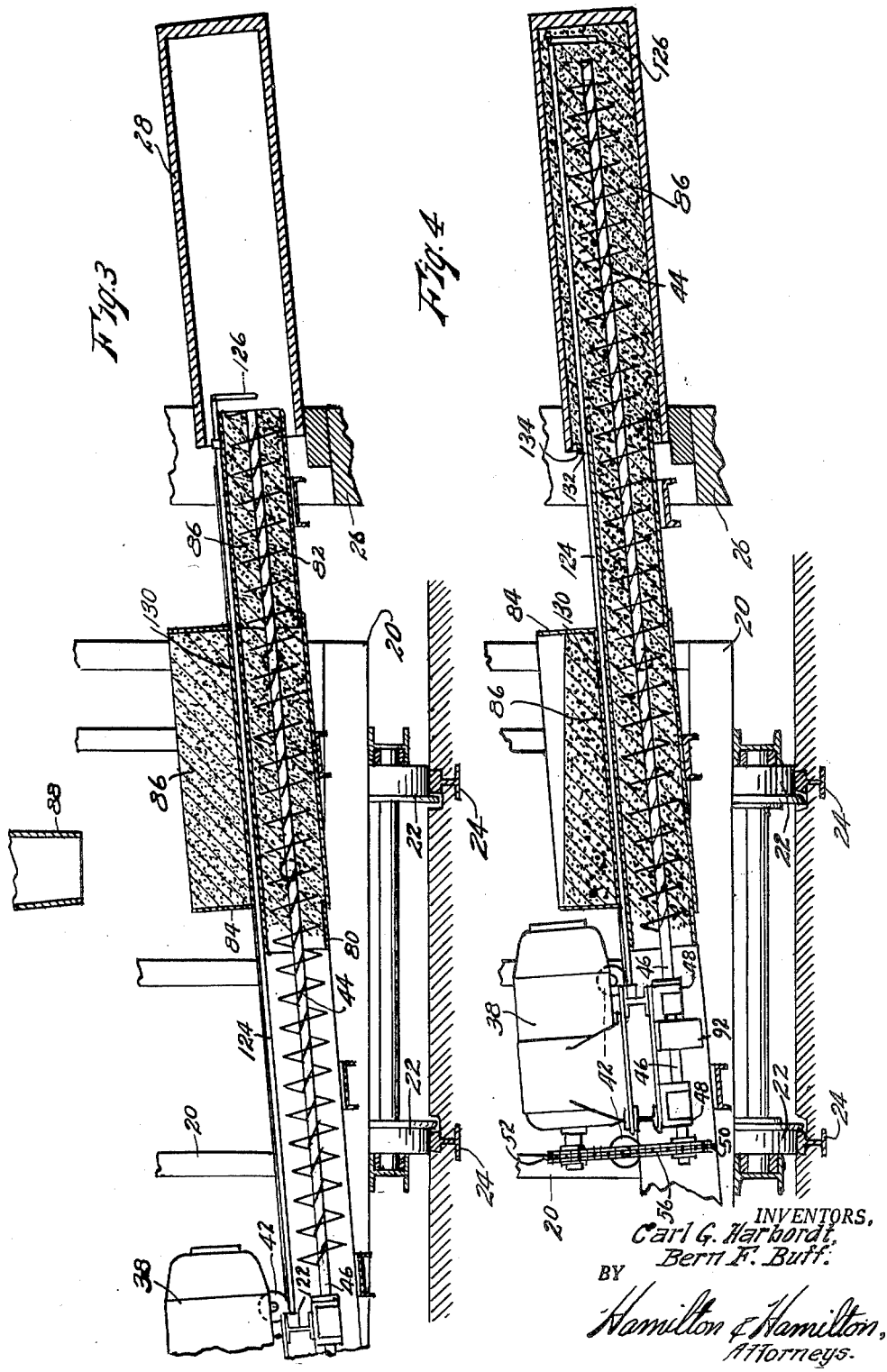

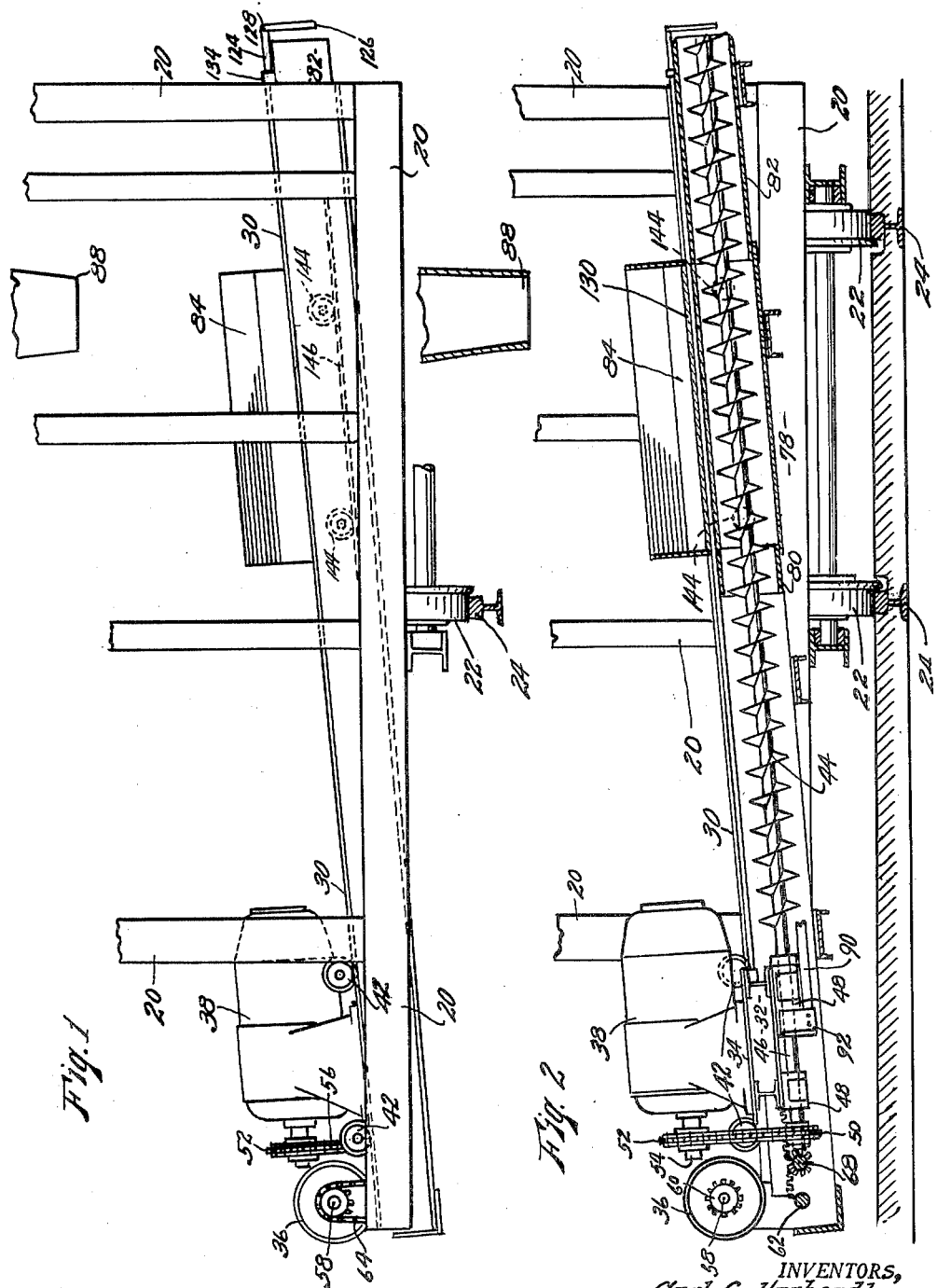

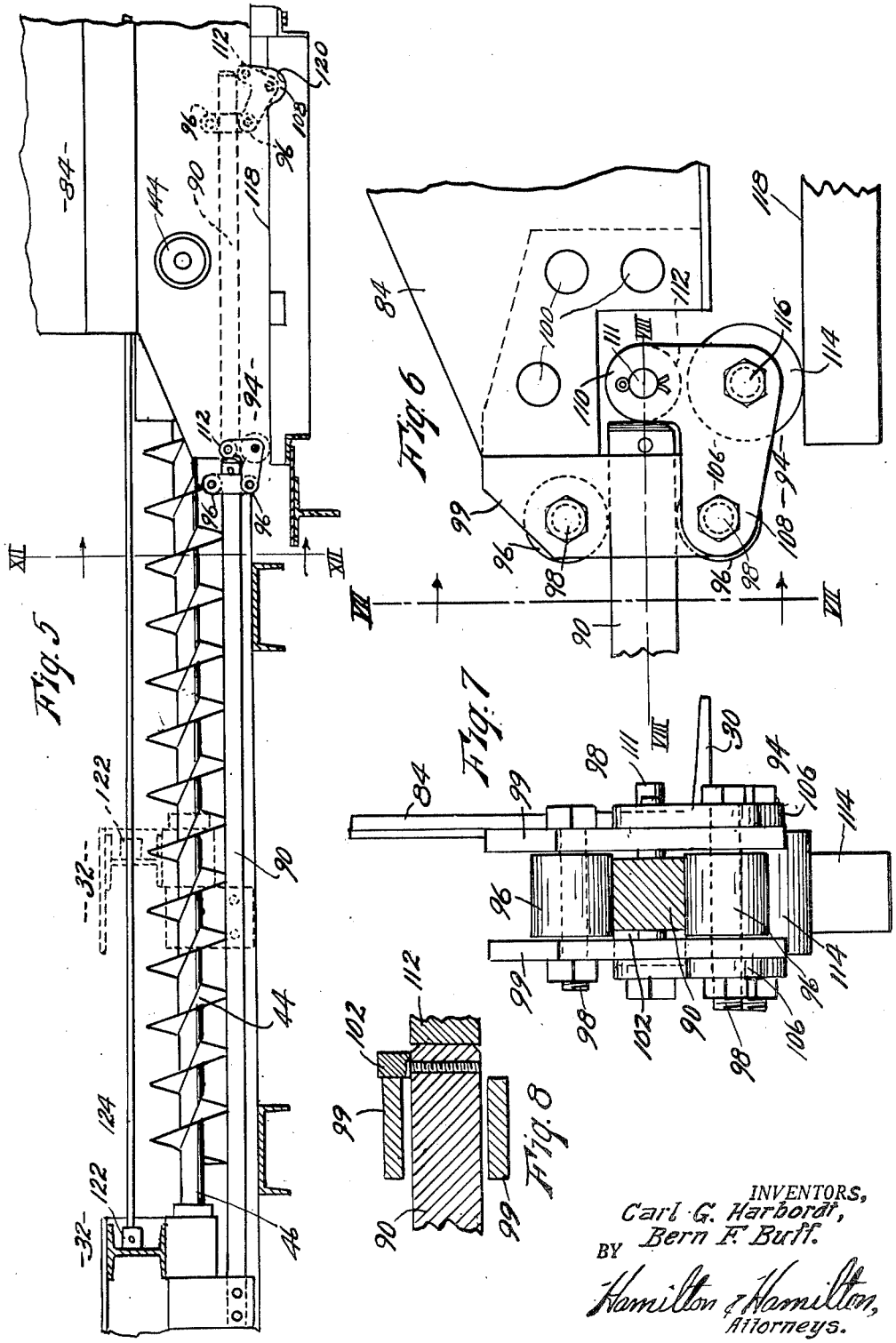

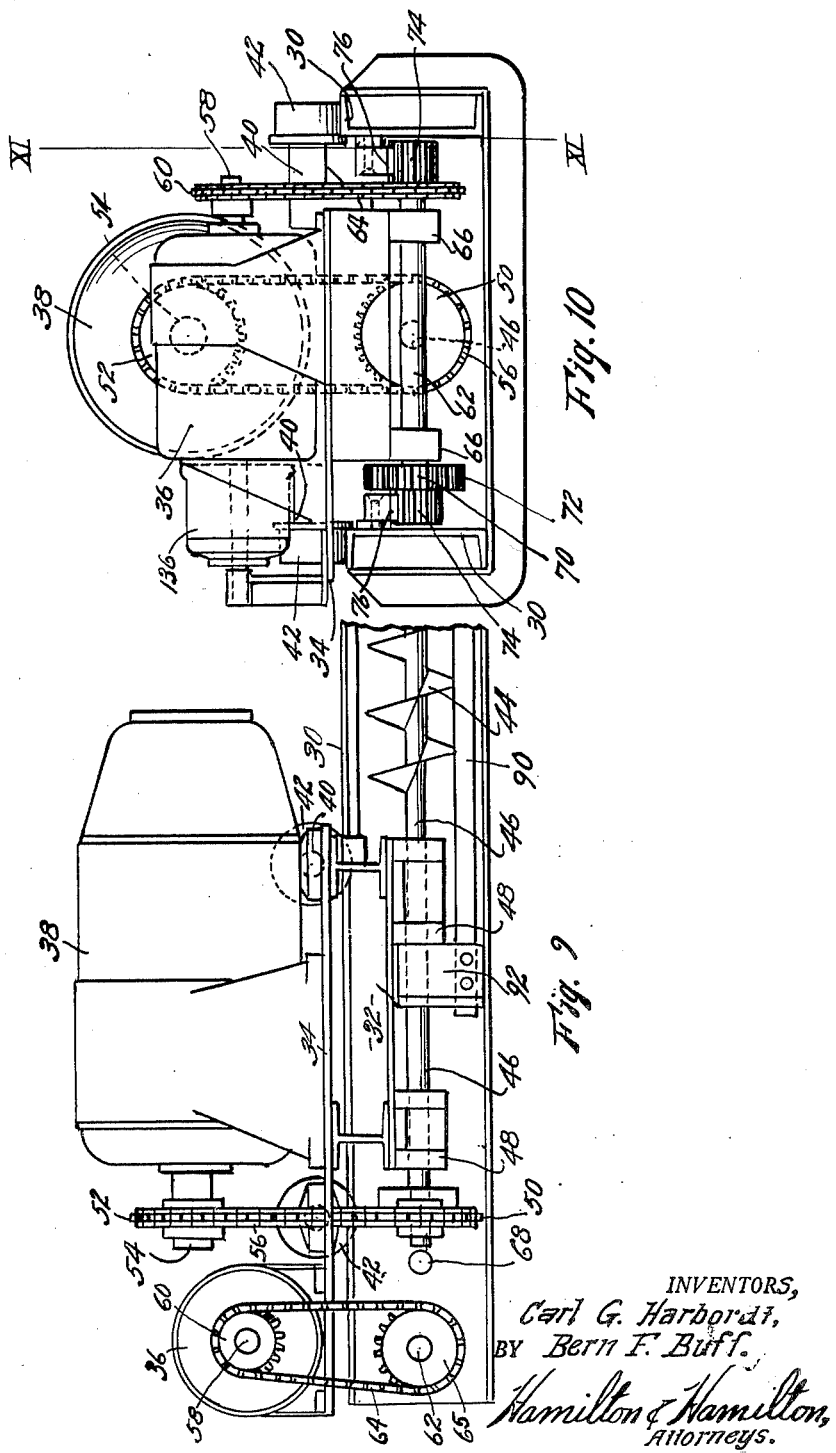

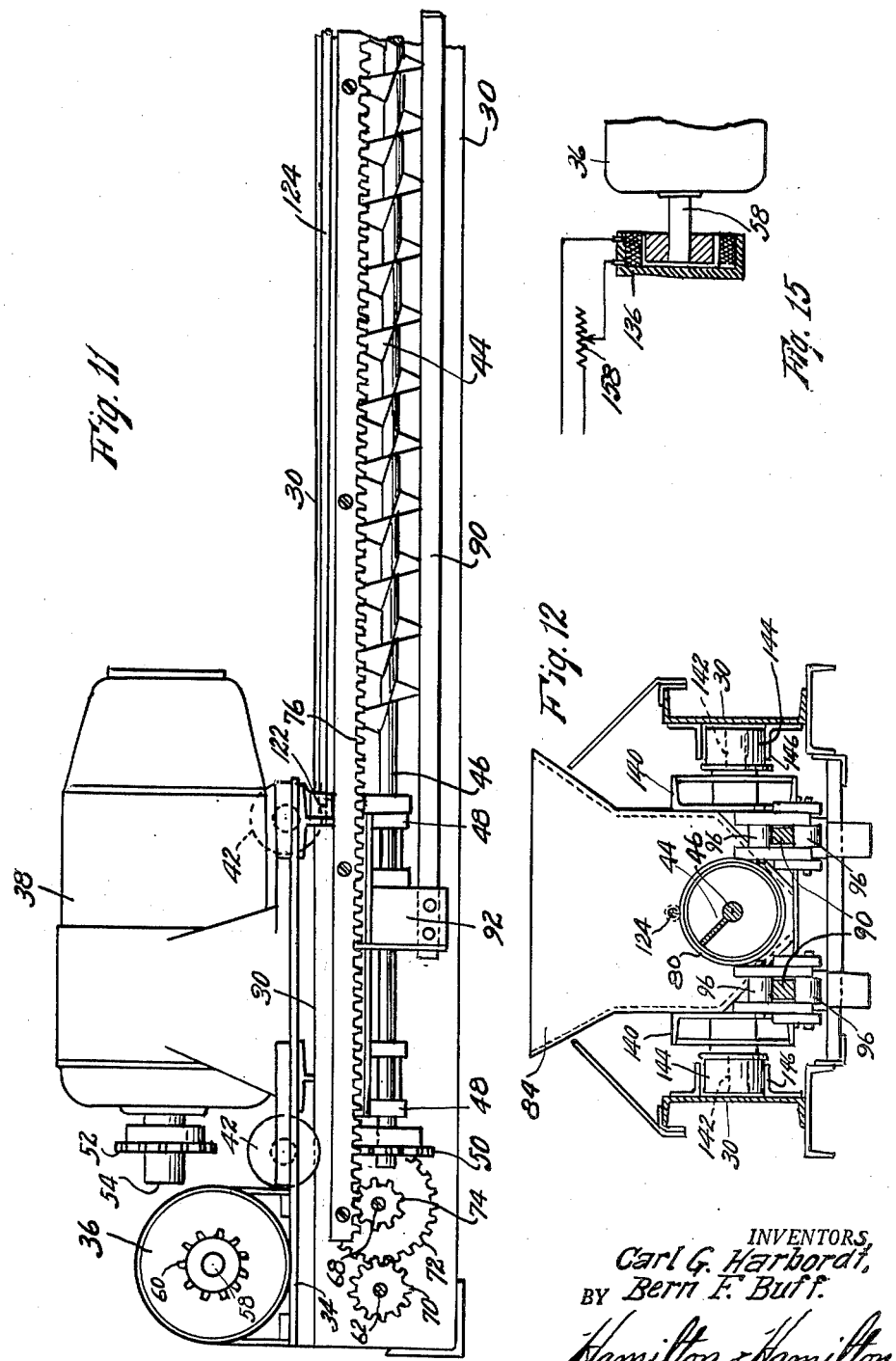

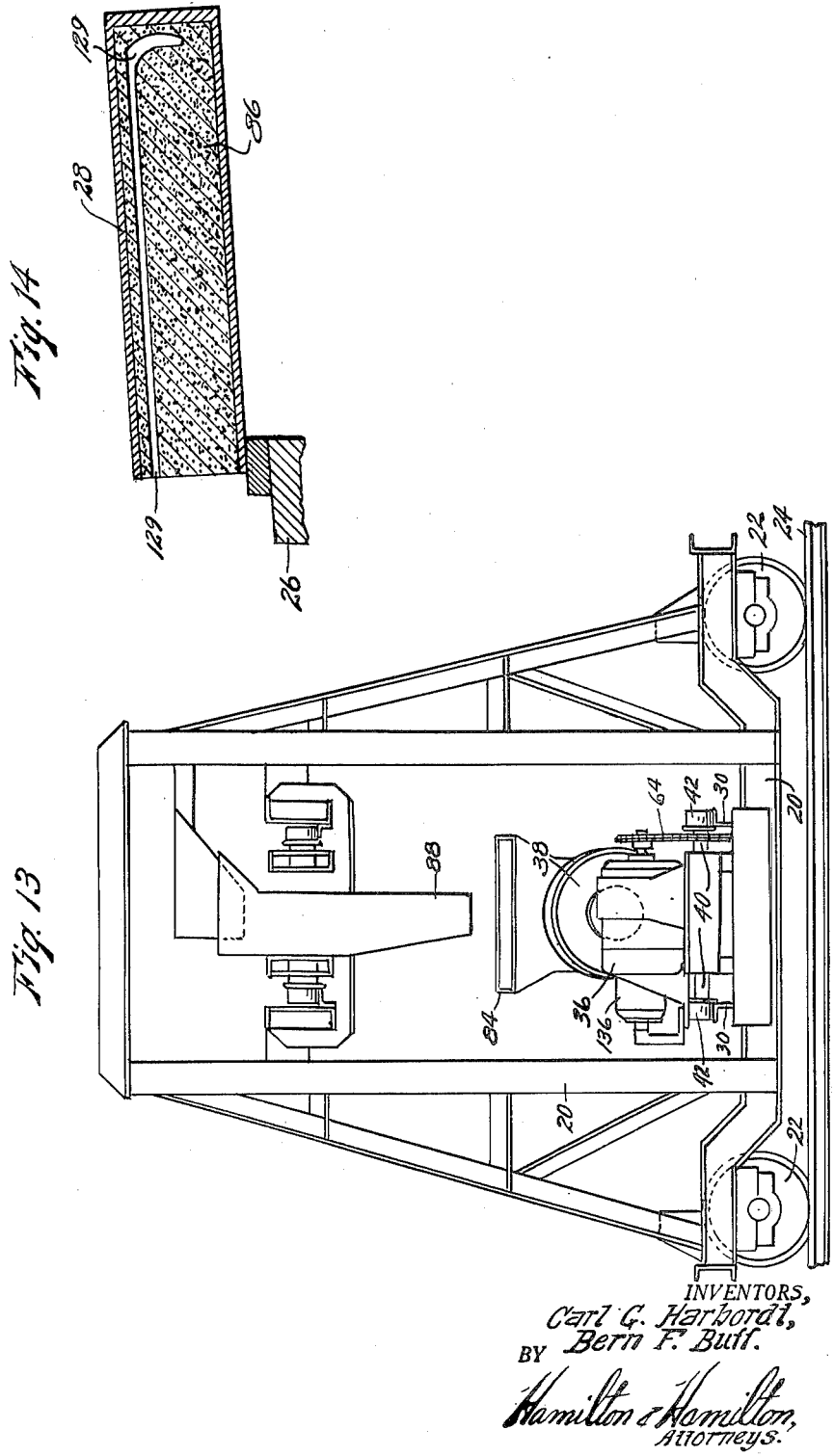

Feb. 1, 1955
C. G. HARBORDT ET AL
2,701,067
RETORT CHARGING MACHINE
Filed May 22, 1952
7 Sheets-Sheet 7
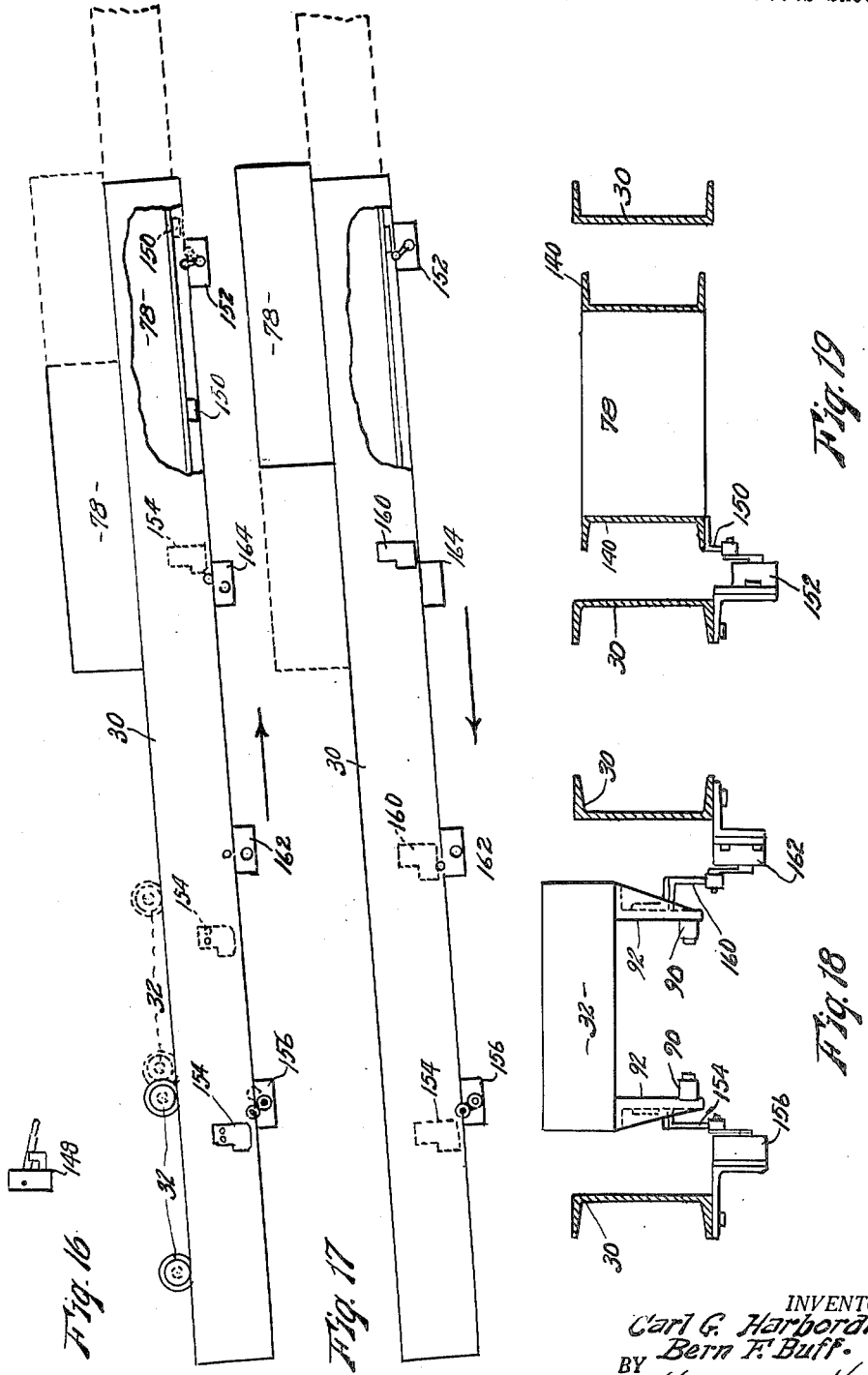
INVENTORS,
Carl G. Harbordt,
Bern F. Buff.
BY
Hamilton & Hamilton,
Attorneys.

United States Patent Office 2,701,067
Patented Feb. 1, 1955

2,701,067

RETORT CHARGING MACHINE

Carl G. Harbordt and Bern F. Buff, Bartlesville, Okla., assignors to National Zinc Company, Inc., Bartlesville, Okla., a corporation of New York Application May 22, 1952, Serial No. 289,376

11 Claims. (Cl. 214—21)

This invention relates to improvements in retort charging machine wherein a screw propeller is automatically driven to properly charge a retort with a suitable ore mixture, and has particular reference to a screw propeller which is mechanically operable to successively charge retorts regularly positioned in a furnace.

For the most part heretofore this retort charging has been done manually with shovels, requiring considerable skill and great physical exertion on the part of the workmen, who also of necessity must work close to the intense heat of the furnace.

The present invention eliminates the manual delivery of the charge to the retort since a charging screw is used to deposit the charge to the retort and is manipulated from controls positioned apart from the hot zones. The machine is capable of charging all retorts uniformly and also of putting more charge in a retort than is manually practicable.

For convenience of operation of the charging machine it is provided with a screw conveyor mounted on a lower truck which is adapted to run parallel with the front of a furnace containing the retorts to be charged, and to run on a track in a direction disposed parallel with the axis of retorts to be charged, whereby successive retorts may be charged in regular order.

Since the same charging means is used to charge in like manner the numerous, similar retorts of a furnace it is considered sufficient to show said charging means as used in one of the retorts and not to show and explain in detail, the specific means for positioning said charging means for charging various retorts disposed at different heights in the furnace nor the means for delivering the ore mixture to the retort charging means which may be subject matter for other patent applications.

Other objects are simplicity and economy of construction, ease and efficiency of operation, the provisions of means for adjusting the amount of charge put into each retort and adaptability for charging retorts of various forms. Further objects and advantages will become apparent as the nature of our invention is better understood from the following description and accompanying drawings, in which:

Fig. 1 is a fragmentary side elevational view of the lower portion of a retort charging machine with the retort charging mechanism shown in elevation.

Fig. 2 is a longitudinal sectional view of the retort charging screw shown in its retracted position with some parts omitted and ready for insertion into a retort not shown.

Fig. 3 is a longitudinal sectional view of the retort charging parts with hopper charged with ore and moved to its second position with the end of the screw inserted into the end portion of the retort to be charged.

Fig. 4 is a longitudinal sectional view of the retort charging parts with the retort charging screw fully extended to pack the retort.

Fig. 5 is an enlarged fragmentary sectional view of the retort charging means including the pusher rods and trip mechanism, shown in solid lines in its retracted position and dotted lines in its extended tripped position.

Fig. 6 is an enlarged fragmentary elevational view of the pusher rod and trip mechanism in their initial position.

Fig. 7 is a sectional view taken on line VII—VII of Fig. 6.

Fig. 8 is a sectional view taken on line VIII—VIII of Fig. 6.

Fig. 9 is an enlarged elevational view of the charging screw and motor carriage.

Fig. 10 is an end view of the parts shown in Fig. 9.

Fig. 11 is a sectional view taken on line XI—XI of Fig. 10 with some parts omitted.

Fig. 12 is a side elevational view taken on line XII—XII of Fig. 5.

Fig. 13 is a side elevational view of the retort charging machine embodying this invention.

Fig. 14 is a sectional view of charged retort showing the air vent formed therein.

Fig. 15 is a diagrammatic view of a portion of the transversely disposed gear motor and the adjustable magnetic brake.

Fig. 16 is a diagrammatic view of the track of the retort charging machine showing the relative positions of vairous stationary limit switches, and their adjustable operative cams in their various positions on the outward movement of the charging screw.

Fig. 17 is diagrammatic of the track and associated parts shown in Fig. 16 to indicate the various operations of the fixed limit switches during the inward movement of the charging screw.

Fig. 18 is a diagrammatic view of some of the charging machine parts showing the transverse relative relation of some of the electrical controlling parts.

Fig. 19 is a diagrammatic view of some of the charging machine parts showing some of the electrical controlling parts on their transverse relative relation.

Throughout the several views of the drawings like numerals indicate similar parts and the numeral 20 indicates a lower truck comprising a main frame mounted on wheels 22 which are adapted to roll on rails 24 forming a track parallel with the front of the furnace 26 having a plurality of retorts 28 mounted tnerein in the usual regular order. These retorts are positioned with their open ends exposed at the front of the furnace and are inclined outwardly and downwardly.

Adjustably fixed to frame 20 is a pair of parallel channel irons 30 which are inclined and disposed in parallel relation with the axes of retorts to form tracks for the retort charging assembly.

This charging assembly includes a motor carriage 32 having a platform body member 34 on which is mounted a transversely disposed gear-motor 36 and a longitudinally disposed gear-motor 38. This platform body member 34 is provided with two sets of oppositely disposed axle members 40 which are adapted to receive flanged wheels 42 which operatively engage the channel iron tracks 30 for movement therealong during the retort charging operation. A helical charging screw 44 having a solid axis 46 is mounted centrally between the tracks 30 and is mounted adjacent its one end by means of pillow blocks 48 secured to body member 34 and extends rearwardly from motor 38 and is provided with a fixed sprocket wheel 50 which is in operative alignment with sprocket wheel 52 fixed to the gear end of motor shaft 54 of motor 38. The motor is of sufficient power to drive charging screw with sufficient force to properly pack the retort for proper recovery of the zinc ore contained therein. Sprocket chain 56 operatively connects sprockets 50 and 52. The gear motor 36 serves to drive the motor carriage 32 along the track 30 during the retort charging operation. Motor 36 is provided at its geared section with a shaft 58 to which is fixed a sprocket wheel 60 which drives shaft 62 through chain 64 and sprocket 65 which is fixed to said shaft. Bearings 66 fixed to body member 34 serve to support shaft 62 and a shaft 68 disposed parallel thereto. Mounted on the outer end of shaft 62 is a pinion 70 which is in mesh with a gear 72 fixed to shaft 68. Opposite ends of shaft 68 are each provided with a pinion 74 which is in mesh with the respective gear racks 76 securely attached to the respective channel irons 30 whereby when the pinions 74 are rotated by the motor 36 the motors and motor carriage will be moved along channel iron tracks 30.

Charging screw 44 extends outwardly to a point spaced apart from the exposed ends of the retorts 28 which are fixed in furnace 26. Screw 44 passes through screw box assembly 78 having tubular sections 80 and 82 disposed respectively at the inner and outer ends of the assembly and having an open hopper section 84 disposed therebetween and adapted to receive a prepared ore mixture 86 to be treated. It will be noted that hopper 84 is of sufficient length to always remain beneath the ore delivery spout 88 positioned thereabove and carried by frame 20. The screw box assembly 78 is provided at its opposite sides with a channel iron section 140 to which is rigidly attached oppositely disposed axle members 142 on which is respectively mounted a flanged roller 144. These rollers are adapted to operatively engage track members 146 which are secured to the inner walls of track members 30 whereby the said screw box assembly may be moved therealong in parallel relation with the charging screw 44 (see Fig. 12).

The two positions of hopper 84 are best shown in Figs. 2 and 3. In Fig. 3 the charging screw and tubular section 82 is shown moved to position into the outer end portion of retort 28 where the ore may be forced into the retort by the charging screw 44 while the screw box assembly remains stationary. The movement of the parts from the position shown in Fig. 2 to the position shown in Fig. 3 is accomplished by means of the following mechanism. A pair of like pusher rods 90 secured at their rear ends to brackets 92 rigidly fixed to motor carriage 32 are extended forwardly to operatively engage a trip mechanism 94 best shown in Figs. 5, 6, 7 and 8. It will be noted that the outer end portions of rods 90 are slidably mounted between spaced apart rollers 96 which are mounted for rotation on bolts 98 which are carried by brackets 99 secured to hopper section 84 by fastening members 100. The outer end portion of each rod 90 has a transversely fixed offset portion 102 which engages one of the brackets 99 whereby the pusher rods cannot be separated from the screw box assembly 78 but can be moved outwardly to extend between the rollers 96. A trip member 94 is of triangular form and comprises two similar angled plates 106 spaced apart to span brackets 99 and pivoted at their rear lower arms 108 by the lower bolt 98 to the hopper member 84. The other upwardly extending arms 110 carry a roller 112 therebetween which is rotatably mounted on pin 111 and normally held in the path of travel of the pusher rods 90 by means of a roller 114 which is rotatably mounted on bolt 116 carried in the angles of members 106.

This roller 114 is adapted to roll on a track member 118 carried by tracks 30. The outer end portion of track 118 is notched at 120 to present a recess to receive roller 114 whereby the rollers 112 may drop down below the path of travel of pusher rods 90 so that they may travel thereover as the screw box assembly stands still during the retort packing operation.

Mounted in a socket 122 carried by motor carriage 32 is a speiss rod 124 extending forwardly beyond charging screw 44 and provided at its forward end with a depending arm 126 pivoted at 128 for free swinging movement. This speiss rod is rectilinear and passes through a tube 130 fixed in hopper 48 and through a hole 132 formed through a lug 132 carried on top of outer tubular section 72 of screw box assembly 78. This speiss rod depending arm 126 is fed into the retort ahead of the charging screw 44 and is drawn from the charged retort to form a vent hole 129 substantially lengthwise of the retort to prevent the accumulation of generated gases that might cause a blowing out of the retort while being heated. This vent hole is best shown in Fig. 14.

After the charging screw 44 has been moved to the position in the retort 28 as shown in Fig. 3 the motor 38 is energized to rotate screw 44 to pack the ore charge into the retort as the motor 36 continues to drive the motor carriage forwardly until the end of charging screw nears the inner closed end of the retort. A switch is now operated to de-energize motor 36 and to simultaneously energize a magnetic brake 136 operatively mounted on the shaft 58 of motor 36 whereby a predetermined back pressure is exerted against the force exerted by the motor 38 to drive the screw 44 to properly regulate the packing of the ore in said retort. When the desired pressure has reached a predetermined degree the brake will slip thus permitting the pressure exerted against the rotating charging screw to force said screw from the retort which will then be properly packed. The backward movement of charging screw 44 will force the motor carriage back until the trip member 104 will take position shown in full lines in Fig. 5. At this time the circuit to motor 38 will be opened by a limit switch. As the movable parts near this position a switch will be automatically operated to start and change the direction of rotation of motor 36 which causes the movable parts to be returned to the initial starting position. Just as the parts are being moved to their starting positions a limit switch opens the circuit to the motor 36 whereby it is de-energized to cushion the momentum of the moving parts to an easy stop.

The general steps of operating of this retort charging machine as disclosed in diagrammatic form as shown in Figs. 16, 17, 18, and 19, begins with the parts in position as shown in Figs. 1 and 2 with all parts at rest, the attendant operates a switch 148 to start motor 36, to drive the motor carriage 32 and supported parts along tracks 30. As the motor carriage is moved along said tracks its first operation will be to move cam 154 to close switch 156 to drive motor 36 after the manual starter switch is released. As said motor carriage moves forwardly the pusher rods 90 which engage the trip mechanism 94 carried by the screw box assembly 78, best shown in Fig. 5 to a position shown in Fig. 3, with the forward end portion of the screw box assembly positioned a short distance into the outer end portion of the retort 28 to be charged. Also the operating cam 150 carried by screw box assembly 78 for operating the on-and-off switch 152 mounted on track member 30 is positioned to close said switch and energize motor 38 to rotate charging screw 44. Motor 36 continues to move carriage 32 along track 30 until the forward end of screw 44 is positioned in the retort 28 in spaced relation to the closed rear end thereof, at this point motor 36 is de-energized as cam members 154 carried by bracket 92 operates limit switch 164 mounted on track 30, to cut off current to motor 36 thus limiting the forward movement of the charging screw 44. At the same time current is fed to the magnetic brake 136 which exerts a braking action on the shaft 58 of motor 36, rheostat 158 serves to regulate the braking action of the magnetic brake.

Since the motor 38 continues to run to rotate charging screw 44 it will fill the closed end portion of retort 28, and cause a back pressure to be built up against screw 44, which will cause the screw to back out of the retort 28 until it turns motor 38 off by reversing the on and off switch 152. Just prior to the shutting off of motor 38 the cam member 160 carried by motor carriage 32 serves to operate switch 162 carried by track member 30 which serves to reverse the direction of drive of motor 36 and starts its operation whereby the screw box assembly and charging screw are forced to their starting position as shown in Fig. 2. The heavy machine parts will gain considerable momentum as they are motor driven. This momentum is buffeted by shutting off motor 36 shortly before the parts reach the end of their stroke thereby permitting the parts to glide to an easy stop.

The type of brake to be associated with the shaft of the motor 36 for driving the carriage 32 away from the retort 28 as shown at 136 of Fig. 10 is not important, it might be a magnetic, solenoid or mechanical brake or any other of the well known types. The most important requirement is that it shall be adjustable to various braking powers whereby it shall operate to resist the tendency of screw 44 to push the carriage from the retort to regulate the degree of density of pack of the material in the retort. This feature is important since different ore mixtures may require different densities of pack.

With the speiss bar constructed and operated as described it is apparent that it will produce the desired vent opening 129 substantially the full length of the retort as shown in Fig. 14. By properly positioning this retort charging machine to other retorts they may be charged in like manner as set forth above.

What we claim as new and desire to protect by Letters Patent is:

1. A machine for charging a retort of a zinc furnace, a lower truck mounted for movement parallel to the front of said furnace, a track carried by said truck in parallel relation with the axes of said retorts, an upper truck mounted on said track for movement therealong, a screw box assembly mounted on said track ahead of said truck for movement therealong, a charging screw carried by said truck to extend through said screw box assembly, a motor carried by said truck operable to move said truck along said track, a pusher rod carried by said truck extending forwardly to engage a trip mechanism carried by said screw box assembly whereby said screw box assembly is moved forwardly a predetermined distance to a position with the forward end thereof positioned in said retort, a motor carried by said truck operable to rotate said charging screw to force an ore mass into said retort to a predetermined density and to force said charging screw from said retort when the desired density in the retort is attained, and an adjustable brake associated with the shaft of said first named motor whereby the density of pack of the retort is regulated.

2. A machine for charging a substantially horizontal retort of a zinc furnace, a truck mounted for movement parallel with the front of said furnace, a track disposed parallel with the axis of said retort, an upper truck mounted on said track for movement therealong, a screw box assembly mounted on said track ahead of said truck for movement therealong, a charging screw carried by said truck to extend through said screw box assembly, a motor carried by said truck operable to move said truck along said track, a pusher rod carried by said truck extended forwardly to engage a trip mechanism carried by said screw box assembly serving to move the forward end of said screw box assembly into the outer end portion of retort to be charged as said latch member is released to stop said screw box assembly, a motor carried by said truck operable to rotate said charging screw as it is moved further into said retort until said truck driving motor is shut off and current is turned on an adjustable brake associated with the shaft of the truck driving motor whereby the density of the pack of the retort is regulated.

3. A machine for charging a substantially horizontal retort of a zinc furnace, a truck mounted for movement parallel with the front of said furnace, a track carried by said truck disposed parallel with the axis of said retort, an upper truck mounted on said track for movement therealong, a screw box assembly mounted on said track ahead of said truck for movement therealong, a charging screw carried by said truck to extend through said screw box assembly, a motor carried by said truck operable to move said truck along said track, a pusher rod carried by said truck extended forwardly to engage a trip mechanism carried by said screw box assembly serving to move the forward end of said screw box assembly into the outer end portion of retort to be charged as said latch member is released to stop said screw box assembly, a motor carried by said truck operable to rotate said charging screw as it is moved further into said retort until said truck driving motor is shut off and current is turned on an adjustable brake associated with the shaft of the truck driving motor whereby the density of the pack of the retort is regulated and a speiss bar carried by said upper truck adapted to be positioned in said retort as the retort is being charged to form a vent hole in the charging material as the speiss bar is withdrawn from said retort.

4. A machine for charging a retort comprising a supporting structure, a truck carried by said supporting structure for movement parallel to the axis of said retort, a charging screw conveyor carried by said truck and operable when advanced into said retort to deliver a charge of material to said retort, an electric motor carried by said truck and operable when energized to move said truck to advance said screw into said retort, a normally de-energized brake associated with said motor and operable when energized to retard rotation of said motor, and electrical means including electric switches carried by said supporting means and operable by the movement of said truck, said electrical means being operable when said screw is advanced into said retort substantially the entire length thereof to de-energize said motor and energize said brake.

5. The structure as set forth in claim 4 including means operable to regulate the braking force applied by said brake when energized.

6. The structure as set forth in claim 4 wherein said brake is electric, and wherein the braking force applied thereby when energized is regulated by the amount of electric current supplied thereto, and including a rheostat associated with said brake and adjustable to regulate the amount of electric current supplied thereto.

7. A machine for charging a substantially cylindrical retort open at one end, said machine comprising a supporting structure, tracks carried by said structure parallel to the axis of said retort, a screw box carried for movement on said tracks and including a tubular portion coaxial with said retort and adapted by movement of said box to enter the open end thereof, a truck carried for movement on said tracks, a conveyor screw carried by said truck and extending axially through the tubular portion of said box, a motor carried by said truck and operable when energized to turn said screw, a second motor carried by said truck and operable when energized to move said truck along said rails to advance said screw into said retort, a latch connection between said truck and said screw box whereby they are secured together with the outer end of said screw substantially flush with the outer end of the tubular portion of said screw box, and whereby said screw box advances with said screw to enter said retort, and latch operating means carried by said supporting means and operable as the tubular portion of said screw box enters the open end portion of said retort to disengage said latch and lock said screw box against movement, whereby said screw may be advanced substantially the full length of said retort without movement of said screw box.

8. The structure as set forth in claim 7 with the addition of electric means including electric switches mounted on said supporting means and operable by the movement of said screw box, said electric means being operable to energize said screw-rotating motor only when the tubular portion of said screw box is extended within said retort.

9. The structure as set forth in claim 7 with the addition of an electric brake associated with said truck-propelling motor and adapted when energized to retard the rotation thereof, means for adjusting the braking force applied by said brake when energized, and electric means including electric switches mounted on said supporting means and operable by the movement of said truck as said screw is advanced substantially to the closed end of said retort to de-energize said truck-propelling motor and energize said brake.

10. The structure as set forth in claim 7 with the addition of a first electric means including electric switches carried by said supporting means and operable by the movement of said screw box to energize said screw-rotating motor only when said screw box is extended within said retort, an electric brake associated with said truck-propelling motor and adapted when energized to retard rotation thereof, means for adjusting the braking force of said brake when energized, and a second electric means including switches carried by said supporting means and operable by the movement of said truck when said screw is advanced substantially to the closed end of said retort to de-energize said truck-propelling motor and energize said brake.

11. The structure as set forth in claim 7 wherein said truck-propelling motor is reversible to advance or retract said screw, and wherein said latch operating means is operable to re-engage said latch connection when said screw is retracted flush with the end of said screw box tube, and with the addition of an electric brake associated with said truck-propelling motor and adapted when energized to retard the rotation thereof, and electric means including switches mounted on said supporting means and operable by the movement of said truck, said electric means being operable when said screw is advanced substantially to the closed end of said retort to de-energize said truck-propelling motor and energize said brake, and operable when said screw is forced outwardly from said retort to a position flush with the end of said screw box to de-energize said brake and energize said motor for reverse rotation to retract said screw and screw box from said retort.

References Cited in the file of this patent

UNITED STATES PATENTS 2,270,381   Morrison _____ Jan. 20, 1942